US012151654B2

(12) United States Patent
Hahn et al.

(10) Patent No.: US 12,151,654 B2
(45) Date of Patent: Nov. 26, 2024

(54) CLEANING DEVICE FOR CLEANING A TRANSPARENT ELEMENT OF AN OPTICAL OR OPTOELECTRONIC DEVICE

(71) Applicant: Continental Automotive GmbH, Hannover (DE)

(72) Inventors: Torsten Hahn, Homberg (DE); Dirk Ringler, Friedewald-Motzfeld (DE)

(73) Assignee: Continental Automotive GmbH, Hannover (DE)

( * ) Notice: Subject to any disclaimer, the term of this patent is extended or adjusted under 35 U.S.C. 154(b) by 495 days.

(21) Appl. No.: 16/604,604

(22) PCT Filed: Apr. 5, 2018

(86) PCT No.: PCT/EP2018/058692
§ 371 (c)(1),
(2) Date: Oct. 11, 2019

(87) PCT Pub. No.: WO2018/189017
PCT Pub. Date: Oct. 18, 2018

(65) Prior Publication Data
US 2020/0156597 A1 May 21, 2020

(30) Foreign Application Priority Data

Apr. 12, 2017 (DE) .................... 10 2017 206 265.7

(51) Int. Cl.
*B60S 1/56* (2006.01)
*B60R 11/04* (2006.01)
(Continued)

(52) U.S. Cl.
CPC ............ *B60S 1/56* (2013.01); *G02B 27/0006* (2013.01); *B60R 2011/004* (2013.01);
(Continued)

(58) Field of Classification Search
CPC .................................................. G02B 27/0006
See application file for complete search history.

(56) References Cited

U.S. PATENT DOCUMENTS 1,792,434 A * 2/1931 Lockwood ............... H05B 3/00
219/385
3,034,726 A * 5/1962 Peras ...................... F23D 11/10
239/434.5

(Continued)

FOREIGN PATENT DOCUMENTS

CN    102267419 A    12/2011
DE    1497581 A1    4/1969
(Continued)

OTHER PUBLICATIONS

German Search Report for German Application No. 10 2017 206 265.7, with partial translation, dated Feb. 27, 2018, 12 pages.
(Continued)

*Primary Examiner* — Spencer E. Bell
*Assistant Examiner* — Omair Chaudhri
(74) *Attorney, Agent, or Firm* — Buchanan Ingersoll & Rooney PC

(57) ABSTRACT

A cleaning device for cleaning a transparent element of an optical or optoelectronic device with a fluid cleaning agent, includes a housing in which the device is arranged. The housing is equipped with an annular channel which can be filled with the cleaning agent via a cleaning agent inlet and encloses at least some areas of the transparent element, and at least one nozzle which is designed to deflect the cleaning agent onto the transparent element and is supplied from the annular channel. The cleaning device allows an increase of uptime and ensured functionality of the optical or optoelectronic device in all weather conditions and operating conditions or to maintain a high degree of uptime and ensured functionality at all times. At least one electrically conductive (Continued)

heating element is provided for heating the annular channel and/or the area of housing directly adjoining the annular channel or the cleaning agent inlet.

9 Claims, 2 Drawing Sheets

(51) Int. Cl.
  *B60S 1/08* (2006.01)
  *B60S 1/48* (2006.01)
  *B60S 1/52* (2006.01)
  *G02B 27/00* (2006.01)
  *B60R 11/00* (2006.01)
  *H04N 23/51* (2023.01)

(52) U.S. Cl.
  CPC ........... *B60R 11/04* (2013.01); *B60R 2300/10* (2013.01); *B60S 1/0848* (2013.01); *B60S 1/488* (2013.01); *B60S 1/52* (2013.01); *H04N 23/51* (2023.01)

(56) References Cited

U.S. PATENT DOCUMENTS

| | | | | |
|---|---|---|---|---|
| 4,508,957 A * | 4/1985 | Rocchitelli | ............. | B60S 1/488 392/479 |
| 4,558,204 A * | 12/1985 | Bleckmann | ............. | A47J 31/542 392/467 |
| 4,815,769 A * | 3/1989 | Hopperdietzel | ......... | H05B 3/58 285/47 |
| 5,361,990 A * | 11/1994 | Pimentel | ................ | F02M 53/06 219/205 |
| 5,791,377 A * | 8/1998 | LaRochelle | ............. | F16L 53/38 15/250.04 |
| 5,957,384 A * | 9/1999 | Lansinger | ................ | B60S 1/50 219/202 |
| 6,220,524 B1 * | 4/2001 | Tores | ........................ | B60S 1/52 239/284.1 |
| 6,442,341 B1 * | 8/2002 | Wu | ......................... | F24H 1/142 392/479 |
| 6,501,907 B1 * | 12/2002 | Rehs | ......................... | B60S 1/52 392/502 |
| 8,671,504 B2 | 3/2014 | Ono et al. | | |
| 2002/0048513 A1 * | 4/2002 | Kleemann | ............... | D06F 39/04 415/175 |
| 2004/0256491 A1 * | 12/2004 | Sporer | ...................... | B60S 1/52 239/525 |
| 2006/0108352 A1 * | 5/2006 | Fernandez | ............... | B60S 1/026 348/E5.026 |
| 2009/0218334 A1 * | 9/2009 | Wallace | .................... | B62J 33/00 219/528 |
| 2012/0055913 A1 * | 3/2012 | Huang | ................... | F24H 9/1827 219/202 |
| 2012/0070142 A1 | 3/2012 | Tregnago et al. | | |
| 2012/0074120 A1 * | 3/2012 | Massold | ............... | F02M 31/125 219/520 |
| 2012/0103958 A1 * | 5/2012 | Wallinger | ................ | H05B 3/58 392/468 |
| 2012/0167327 A1 * | 7/2012 | Kasack | ................. | F16L 29/007 15/250.04 |
| 2012/0170119 A1 * | 7/2012 | Chu | ........................ | G03B 11/00 359/512 |
| 2013/0146577 A1 | 6/2013 | Haig et al. | | |
| 2013/0219742 A1 | 8/2013 | Field et al. | | |
| 2014/0042243 A1 * | 2/2014 | Kim | .......................... | B60S 1/48 239/130 |
| 2014/0217079 A1 * | 8/2014 | Nelson | ..................... | H05B 3/26 219/202 |
| 2014/0259503 A1 * | 9/2014 | Caillot | ..................... | B60S 1/487 15/250.05 |
| 2014/0352095 A1 * | 12/2014 | Caillot | ..................... | B05B 1/24 15/250.05 |
| 2014/0374505 A1 * | 12/2014 | Munk | ..................... | B60S 1/488 239/133 |
| 2015/0040953 A1 | 2/2015 | Kikuta et al. | | |
| 2015/0139631 A1 * | 5/2015 | Caillot | .................... | B60S 1/488 392/480 |
| 2015/0166019 A1 * | 6/2015 | Caillot | .................... | H05B 3/48 15/250.04 |
| 2015/0182064 A1 * | 7/2015 | Hofer | ..................... | F24H 1/162 392/481 |
| 2015/0336544 A1 * | 11/2015 | Kong | ....................... | B05B 1/24 239/130 |
| 2015/0344001 A1 * | 12/2015 | Lopez Galera | ........... | B60S 1/56 134/198 |
| 2016/0001330 A1 | 1/2016 | Romack et al. | | |
| 2016/0103316 A1 * | 4/2016 | Rousseau | .................. | B60R 1/00 359/509 |
| 2016/0109152 A1 * | 4/2016 | Teufl | ..................... | F24H 9/2028 392/314 |
| 2017/0023164 A1 * | 1/2017 | Wildegger | .............. | F16L 53/38 |
| 2017/0072914 A1 * | 3/2017 | Caillot | .................... | F16L 53/38 |
| 2017/0120875 A1 * | 5/2017 | Kong | ........................ | B60S 1/52 |
| 2017/0190320 A1 * | 7/2017 | Caillot | .................... | B60S 1/524 |
| 2017/0355352 A1 * | 12/2017 | Bulgajewski | ............ | H05B 3/42 |
| 2017/0369039 A1 | 12/2017 | Rousseau | | |
| 2018/0017785 A1 * | 1/2018 | Bulgajewski | ....... | G02B 27/0006 |
| 2018/0080591 A1 * | 3/2018 | Etscheid | .................. | H05B 3/44 |
| 2018/0081169 A1 * | 3/2018 | Karasik | ..................... | B60S 1/56 |
| 2018/0201232 A1 * | 7/2018 | Ringler | ..................... | B08B 3/02 |
| 2018/0207691 A1 * | 7/2018 | Byrne | ................. | G02B 27/0006 |
| 2018/0265049 A1 * | 9/2018 | Schmidt | .................. | B60S 1/54 |
| 2018/0272999 A1 * | 9/2018 | Giraud | .................... | B60S 1/488 |
| 2018/0304863 A1 * | 10/2018 | Picot | ......................... | B08B 3/02 |
| 2018/0354467 A1 * | 12/2018 | Glickman | ................. | B60S 1/56 |
| 2018/0363945 A1 * | 12/2018 | Dellock | ................... | B60S 1/488 |
| 2018/0370497 A1 * | 12/2018 | Häfner | ..................... | B60S 1/488 |
| 2019/0011151 A1 * | 1/2019 | Wagner | ................. | F24H 9/1818 |
| 2019/0047520 A1 * | 2/2019 | Giraud | ..................... | B60S 1/481 |
| 2019/0137723 A1 * | 5/2019 | Bernal | .................. | H04N 5/2254 |
| 2019/0302576 A1 * | 10/2019 | Rafalowski | ............ | G03B 17/55 |
| 2020/0001833 A1 * | 1/2020 | Lomer | .................... | B60S 1/488 |

FOREIGN PATENT DOCUMENTS

| | | | | |
|---|---|---|---|---|
| DE | 19807594 A1 * | 9/1998 | ............... | B05B 1/10 |
| DE | 29920259 U1 * | 2/2000 | ............... | B05B 1/24 |
| DE | 102007005130 A1 * | 8/2008 | ............... | B60B 1/24 |
| DE | 202008007392 U1 * | 12/2009 | ............... | F16L 11/12 |
| DE | 102011084865 A1 * | 4/2013 | ............... | B60S 1/488 |
| DE | 102014205108 A1 * | 9/2015 | ............... | B60S 1/52 |
| DE | 102014213283 A1 * | 1/2016 | ............ | B60S 1/0848 |
| DE | 102015217546 B3 | 3/2017 | | |
| EP | 272480 B1 * | 3/1990 | | |
| EP | 667267 A1 * | 8/1995 | ............. | B60S 1/488 |
| EP | 599172 B1 * | 9/1996 | ............ | A47J 31/542 |
| GB | 2150821 A * | 7/1985 | ............... | B05B 1/24 |
| GB | 2250218 A * | 6/1992 | ............... | B05B 1/24 |
| GB | 2295758 A * | 6/1996 | ............... | B05B 1/24 |
| GB | 2350556 A * | 12/2000 | ............. | B60S 1/3805 |
| JP | 07329734 A * | 12/1995 | ............. | B60S 1/488 |
| KR | 20100027462 A * | 3/2010 | | |
| WO | 2016116568 A1 | 7/2016 | | |
| WO | 2016164173 A1 | 10/2016 | | |

OTHER PUBLICATIONS

International Search Report and Written Opinion for International Application PCT/EP2018/058692, dated Jun. 21, 2018, 8 pages.
Chinese Office Action for Chinese Application No. 201880038681.7, dated Aug. 31, 2022, with translation, 10 pages.

* cited by examiner

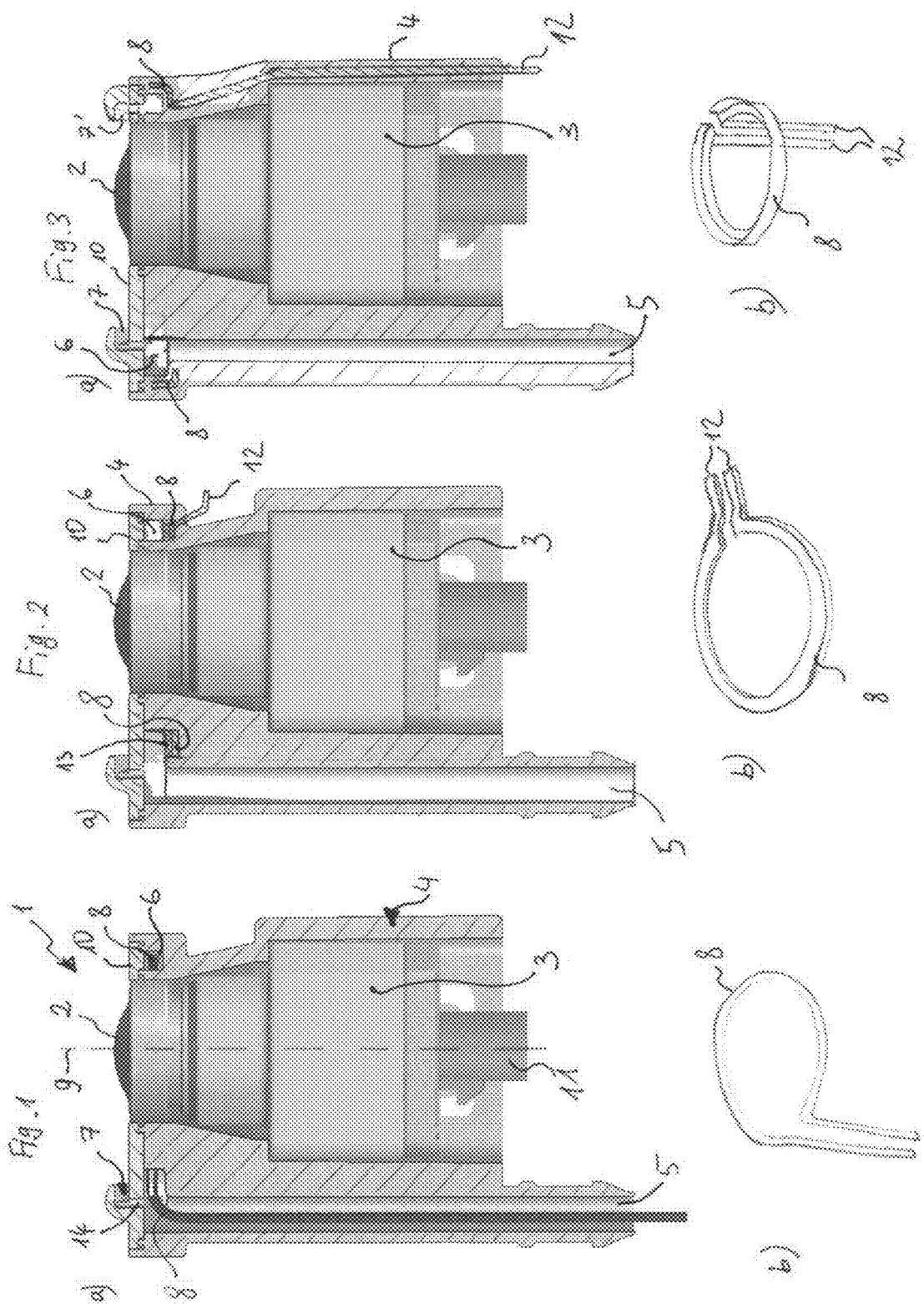

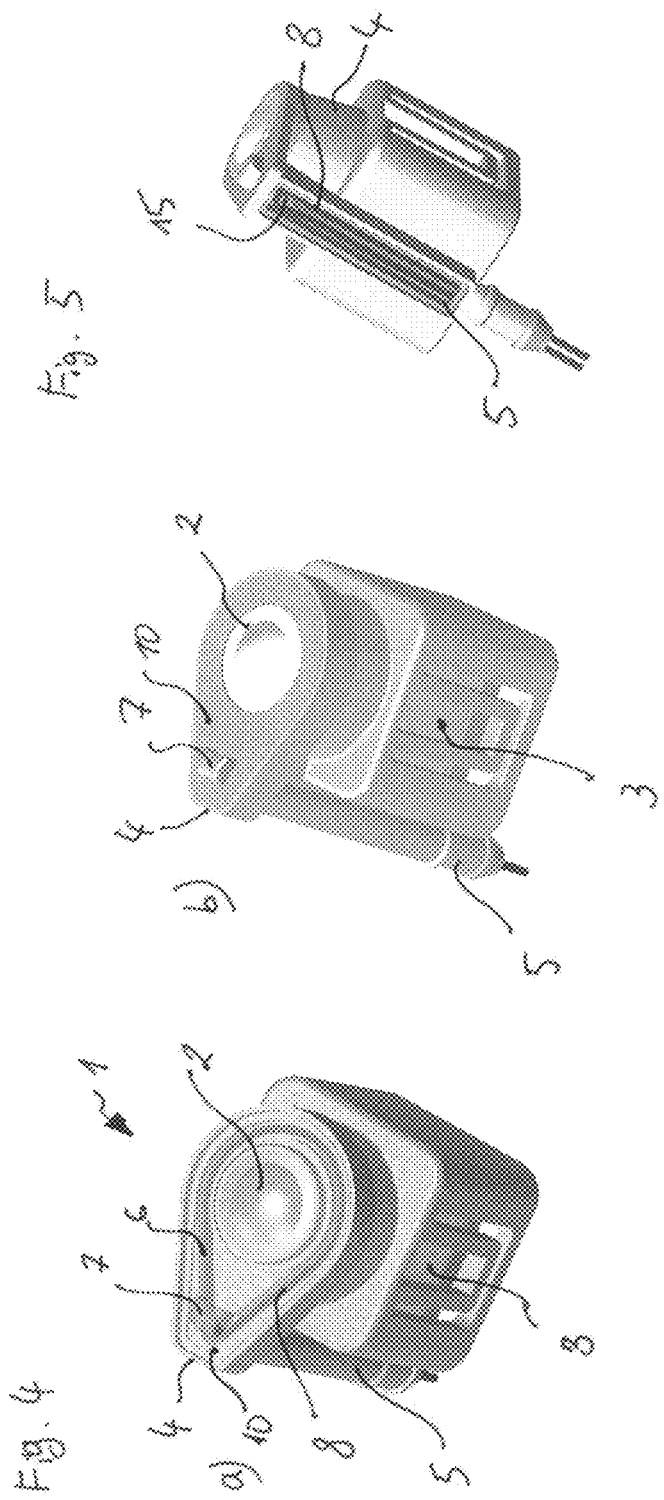

CLEANING DEVICE FOR CLEANING A TRANSPARENT ELEMENT OF AN OPTICAL OR OPTOELECTRONIC DEVICE

CROSS REFERENCE TO RELATED APPLICATIONS

This application is the U.S. National Phase Application of PCT International Application No. PCT/EP2018/058692, filed Apr. 5, 2018, which claims priority to German Patent Application No. 10 2017 206 265.7, filed Apr. 12, 2017, the contents of such applications being incorporated by reference herein.

FIELD OF THE INVENTION

The invention concerns a cleaning device for cleaning a transparent element of an optical or optoelectronic device, in particular a camera, as well as an optical sensing device to be disposed in a vehicle, comprising said optical or optoelectronic device with cleaning device and a vehicle in which said cleaning device or optical sensing device is installed.

BACKGROUND OF THE INVENTION

Today's motor vehicles are increasingly fitted with assistance systems with sensors that support the vehicle user whilst driving the vehicle, which are designed to reliably sense and monitor the surroundings of the vehicle at all times. To this end assistance systems of this kind include optical or optoelectronic devices such as, for example, cameras, laser-based or infrared sensors. Such devices are provided with transparent elements such as lenses or covers, which permit the light, depending on application, to pass through uninhibited or permit a certain limited wavelength range only. Transparent elements of this kind are often convex or domed on the outside so as to, for example, provide a particularly wide coverage for a camera like, for example, the so-called fisheye camera lenses. Moreover, transparent elements of this kind are, due to their function, disposed on the outside of the vehicle and are thus exposed year-round to soiling and external weather events under different climatic conditions and, in order to ensure their functionality, need to be cleaned if necessary and be kept free of ice. In this instance the spatial position of the nozzle in installation position in the vehicle also plays a significant role because, firstly, care must be taken so as not to limit the field of view of the optical or optoelectronic device where possible and, secondly, specific conditions in driving mode must be taken into consideration such as, for example, air flows in the proximity of surfaces that are able to significantly influence the spray and flow direction of cleaning agents.

The document DE 10 2015 217 546 B3, incorporated herein by reference, discloses a cleaning device of this kind for a camera in which the outlet openings or nozzles are supplied through a common annular channel that extends radially around the lens of the camera. This allows the nozzles to be positioned through arbitrary rotation around the optical axis of the camera with only a small engineering effort and thus may be efficiently adapted for different applications and the cleaning device may be operated at a relatively low pressure.

A constant desire for increased efficiency, reduction of interfering influences on the external appearance of the vehicle as well as the general technological advancement lead to the miniaturization, reduction in power consumption and increase in efficiency of the optical and optoelectronic devices used. However, this makes them more sensitive to soiling and to environmental conditions, which means that under extreme conditions and in particular their de-icing at low temperatures below the freezing point as well as snowfall, reliable cleaning with known cleaning systems requires more time, uses more cleaning agent and requires a higher operating pressure.

SUMMARY OF THE INVENTION

Based on this background an aspect of this invention is an improved cleaning device that makes it possible to increase uptime and ensure the functionality of the optical and optoelectronic devices in all weather conditions and operating modes or to maintain them at a high level at all times.

An aspect of the invention provides that at least one electrically conductive heating element is provided to heat the annular channel and/or at least an area of the housing that directly adjoins to the annular channel, or the cleaning agent inlet.

In this instance the annular channel of the preferred further development is formed by a recess in the housing, which radially surrounds an optical axis of the device and is closed by a cover element. In this instance at least one nozzle is disposed on the cover element, and the interface between the cover element and the housing is hydraulically sealed, preferably firmly bonded, in particular welded.

A compact and effective cleaning device with broad application options is thus created, which operates reliably under all weather conditions. Icing can be prevented particularly effectively and the consumption of liquid de-icing components within the cleaning agent is reduced significantly, and the overall integrity of the system is increased at low temperatures. In this instance the cleaning effect is determined by a system of multiple influencing factors. Said system consists of the number of nozzles, the pressure and quantity of the cleaning agent, the spray duration and the number of repeats. With an aspect of the invention each of the individual parameters of this system may be optimally adjusted to the respective requirements.

In addition the optical or optoelectronic device used is indirectly heated and is thus kept inside an optimal temperature range. Moreover, formation of condensation is reliably prevented, which improves the optical quality.

According to a preferred embodiment of the invention the nozzle is formed in one piece with the cover element. Advantageously the design, number and position of the nozzles may be arranged and combined in almost unlimited variations. Thus, simply by providing different variations of the cover element, which can be manufactured cost-effectively, the cleaning device in its variations can be adapted cost-effectively to the most varied application scenarios and installation locations without the necessity of changing other parts and components.

According to a first embodiment according to the invention the heating element in the housing is designed to be disposed within the annular channel, particularly preferred additionally in the cleaning agent inlet. This makes it possible to design the heating element particularly cost-effective as heating wire, which is able to heat the cleaning agent instantly and directly, as well as the surroundings and the optical or optoelectronic device indirectly through heat transfer from the annular channel into the housing and to the optical or optoelectronic device inserted into the housing. Furthermore, heating of the entire feed line is also made possible.

According to a different embodiment according to the invention the heating element may be formed from a flat, metallic material, in particular as a press-formed part and, according to a preferred further development, may be disposed directly inside the housing outside the annular channel, in particular by means of injection molding or casting with a casting compound. This makes it possible to achieve a particularly effective conductive heat transfer, which is additionally increased by larger surfaces. Moreover, it provides the option to heat the housing dry and to preheat it in order to, for example, avoid icing up or the formation of condensation on the transparent element without the need to use some of the cleaning agent. Furthermore, the heating element is effectively protected from direct contact with the cleaning agent, which reduces the danger of corrosion and short circuits. Furthermore, the electrical heating element connection—for example a plug—may advantageously be disposed at any desired location on the housing as required, independent from the water supply line and without a special seal.

An aspect of the invention concerns also an optical sensing device for arrangement on a vehicle, comprising a camera with a cleaning device that is designed according to one of the above-described embodiments, as well as a vehicle in which a corresponding optical sensing device or the cleaning device according to an aspect of the invention is disposed.

BRIEF DESCRIPTION OF THE DRAWINGS

An aspect of the present invention will now be described in greater detail by way of the exemplary embodiments that are depicted in a simplified manner in the figures. Shown are in:

FIG. 1 a first embodiment according to the invention of the cleaning device with an optical or optoelectronic device disposed therein in cross-sectional representation (view a) as well as the related heating element (view b).

FIG. 2 a second embodiment according to the invention of the cleaning device with an optical or optoelectronic device disposed therein in cross-sectional representation (view a) as well as the related heating element (view b).

FIG. 3 a third embodiment according to the invention of the cleaning device with an optical or optoelectronic device disposed therein in cross-sectional representation (view a) as well as the related heating element (view b).

FIG. 4 The embodiment according to FIG. 1 shown with a transparent (view a) as well as an opaque (view b) cover element, each in three-dimensional representation.

FIG. 5 A three-dimensional representation of a further embodiment of the cleaning device according to the invention with an optical or optoelectronic device disposed therein and with a heating element that is simply disposed in the cleaning agent inlet, wherein a cover of the cleaning agent inlet is not depicted for reasons of clarity.

Unless stated otherwise, the same or equivalent elements and devices are marked with the same reference numbers in all figures.

DETAILED DESCRIPTION OF THE PREFERRED EMBODIMENTS

FIG. 1

FIG. 1 depicts a first embodiment of the cleaning device 1 according to the invention. An optical or optoelectronic device 3 is disposed, preferably detachable and in particular latched, in a housing 4.

The electrical interface 11 serves to connect device 3 to one or more electrical supply facilities and electronic control units, which are not shown here.

A fluid, preferably a liquid cleaning agent is conveyed by a conveying means (not shown)—for example a pump—through a tube-like cleaning agent inlet 5 into an annular channel 6 that is formed into housing 4.

The annular channel 6 is essentially formed by a recess inside housing 4, which extends radially around an optical axis (9) of device 3. It is closed by a cover element 10, which is attached to housing 4 in a sealed and pressure-tight manner, welded in the present exemplary embodiment.

A nozzle 7 is disposed on the cover element 10 and is hydraulically connected with the annular channel 6 through a borehole 14. When the not-depicted conveying means is operated, the cleaning agent is conveyed from the annular channel 6 through the borehole 14 into the nozzle 7 and from there to the surface of the transparent element 2.

The nozzle 7 in the embodiment shown is provided in form of a deflector, which permits a particularly flat design so as to reduce any optical interferences of the device 3. Nevertheless, within the scope of an aspect of the invention it is equally possible to provide the nozzle in form of a chip, a ball insert or an integrated channel or borehole.

Also, a mixture of a liquid and a gas, for example compressed air, is admissible as cleaning agent within the scope of an aspect of the invention.

A heating element 8 is disposed in the annular channel 6 as well as inside the cleaning agent inlet 5. In the embodiment shown, the heating element 8 is provided in form of a heating wire or heating resistor respectively that is installed in a loop-like arrangement which, when applying a supply voltage, heats up the cleaning agent instantly and directly, and indirectly heats the adjoining area of housing 4 and the device 3 accommodated therein.

The connection of the cleaning agent inlet 5 may be facilitated, for example, through a tube with an internal heating wire, or through an electro-hydraulic fitting, which simultaneously facilitates the supply of cleaning agent and electric power.

FIG. 2

FIG. 2 depicts a second embodiment of the cleaning device 1 according to the invention. In contrast to the embodiment according to FIG. 1 the heating element 8 is in this instance essentially annular, with a protruding heating element connection 12, stamped out from a sheet metal material. In contrast to the previously described embodiment, the heating element is placed into the recessed annular channel 6 and cast over with a casting compound 13, which isolates it from the wetted part of the annular channel 6. This allows the electrical heating element connection 12 to protrude at any desired and suitable location from the housing 4.

FIG. 3

The third embodiment of the cleaning device 1 according to the invention is provided with two nozzles 7,7', which are supplied from the annular channel 6. It is fundamentally possible to use three or more nozzles within the scope of an aspect of the invention.

The heating element 8 is press-formed from a sheet metal material and is provided with a separate heating element connection 12; it is, however, embedded directly inside housing 4, for example injection-molded, in contrast to the embodiment according to FIG. 2. To improve the heat transfer from the heating element 8 to the inner space of the annular channel 6 as well as to the adjoining area of housing 4 and to the device 3 disposed therein, the heating element 8 is shown to have an L-shaped cross-section.

FIG. 4

The FIG. 4 depicts the embodiment according to FIG. 1 in three-dimensional view. In this instance the cover element in view a) is shown transparent so as to clearly show the internal design of the annular channel 6 and the positioning of the heating element 8. View b) shows the cleaning device 1 in its installable state.

FIG. 5

FIG. 5 depicts a further embodiment of the cleaning device 1 according to the invention. Just like in the embodiment according, to FIG. 1, the heating element 8 is provided in form of a wire, but it is only disposed inside the cleaning agent inlet 5 and no longer inside annular channel 6. A pin-like redirecting element 15 facilitates the redirection of the heating element 8 and holds it in place at the same time. A technologically required rear cover of the cleaning agent inlet 5 is not shown here for reasons of clarity.

The individual characteristics of the embodiments shown are not necessarily limited by each of their depicted combinations but they can, within the scope of an aspect of the invention, be combined in any way to form further embodiments that are not explicitly shown here without leaving the invention.

LIST OF REFERENCE NUMBERS

1 Cleaning device
2 Transparent element
3 Optical or optoelectronic device
4 Housing
5 Cleaning agent inlet
6 Annular channel
7 Nozzle
8 Heating element
9 Optical axis
10 Cover element
11 Electrical interface
12 Heating element connection
13 Casting compound
14 Borehole
15 Redirecting element

The invention claimed is:

1. A cleaning device for cleaning of a transparent element of an optical or optoelectronic device with a fluid cleaning agent, comprising:
a housing in which the optical or optoelectronic device is disposed, the housing comprising an annular channel configured to receive via a cleaning agent inlet the cleaning agent, wherein said annular channel at least partially encloses the transparent element,
at least one nozzle which is designed to spray the cleaning agent onto the transparent element and which is fed from the annular channel, and
at least one electrically conductive heating element is provided for heating the annular channel and/or an area of the housing that immediately adjoins the annular channel, the at least one electrically conductive heating element being provided as a press-formed part from a sheet metal material, the at least one electrically conductive heating element being made from a single piece of flat, metallic material having an annular portion with two opposed ends forming a pair of protruding connecting portions, the annular portion extending within the annular channel and covered with a casting compound separate from the housing to isolate the at least one electrically conductive heating element from a wetted part of the annular channel, the pair of protruding connecting portions extending radially outward from the annular portion through an exterior sidewall of the housing.

2. The cleaning device according to claim 1, wherein the annular channel is formed by a recess inside housing, which radially surrounds an optical axis of the optical or optoelectronic device and is closed by a cover element, wherein the at least one nozzle is disposed on the cover element and an interface between the cover element and the housing is made liquid tight.

3. The cleaning device according to claim 2, wherein the at least one nozzle is made in one piece with the cover element.

4. The cleaning device according to claim 1, wherein the at least one electrically conductive heating element is disposed in the housing inside the annular channel.

5. The cleaning device according to claim 1, wherein the at least one electrically conductive heating element is disposed in the housing outside the annular channel.

6. An optical sensing device for arrangement inside a vehicle, comprising an optical or optoelectronic device, which is provided with a cleaning device according to claim 1.

7. A vehicle in which a cleaning device according to claim 1 is disposed.

8. A vehicle in which an optical sensing device according to claim 6 is disposed.

9. The cleaning device according to claim 1, wherein the annular channel is formed by a recess inside housing, which radially surrounds an optical axis of the optical or optoelectronic device and is closed by a cover element, wherein the at least one nozzle is disposed on the cover element and an interface between the cover element and the housing is bonded.

* * * * *